(12) United States Patent
Ricci et al.

(10) Patent No.: US 11,109,613 B2
(45) Date of Patent: Sep. 7, 2021

(54) RECIPE FOR VEGETABLE GNOCCHI AND THE PRODUCTION PROCESS THEREOF

(71) Applicant: BOCON S.r.l., Pieve di Soligo (IT)

(72) Inventors: Luca Ricci, Susegana (IT); Donatella Moro, Susegana (IT); Omar Baldassini, Susegana (IT)

(73) Assignee: BOCON S.R.I., Pieve di Soligo (IT)

( * ) Notice: Subject to any disclaimer, the term of this patent is extended or adjusted under 35 U.S.C. 154(b) by 304 days.

(21) Appl. No.: 16/223,883

(22) Filed: Dec. 18, 2018

(65) Prior Publication Data

US 2020/0187529 A1    Jun. 18, 2020

(51) Int. Cl.
| | |
|---|---|
| *A23L 7/109* | (2016.01) |
| *A23L 19/00* | (2016.01) |
| *A23L 7/10* | (2016.01) |
| *A23L 5/10* | (2016.01) |
| *A23P 20/10* | (2016.01) |
| *A23L 3/36* | (2006.01) |

(52) U.S. Cl.
CPC ............ *A23L 7/109* (2016.08); *A23L 3/36* (2013.01); *A23L 5/15* (2016.08); *A23L 7/198* (2016.08); *A23L 19/09* (2016.08); *A23P 20/11* (2016.08); *A23V 2002/00* (2013.01)

(58) Field of Classification Search
CPC . A23L 7/109; A23L 19/09; A23L 5/15; A23L 3/36; A23V 2002/00
USPC ............ 426/302, 497, 521, 615, 622
See application file for complete search history.

(56) References Cited

U.S. PATENT DOCUMENTS

| | | | |
|---|---|---|---|
| 5,433,964 A | * | 7/1995 | Norman et al. |
| 2009/0311386 A1 | * | 12/2009 | Nell et al. |
| 2016/0073665 A1 | * | 3/2016 | Mohindru |
| 2018/0310597 A1 | * | 11/2018 | Ito et al. |

FOREIGN PATENT DOCUMENTS

WO    WO 2016/184506    * 11/2016

OTHER PUBLICATIONS

Food Network, Cauliflower Gnocchi, pp. 1-4, https://www.foodnetwork.com/recipes/food-network-kitchen/cauliflower-gnocchi-4610559. (Year: 2017).*

Chauhan et al. Journal of Food, May 1, 2013, vol. 11 (2), p. 142-149, Influence of vegetable purees on quality attributes of pastas made from bread wheat, one page. (Year: 2013).*

* cited by examiner

*Primary Examiner* — Helen F Heggestad
(74) *Attorney, Agent, or Firm* — Oliff PLC

(57) ABSTRACT

A recipe industrially produces vegetable gnocchi, and, in particular, cauliflower gnocchi, and a production process thereof. Moreover, the gnocchi is obtained by the process in order to provide a food product that is nutritionally advantageous and easy to produce on an industrial level without any disadvantages.

12 Claims, No Drawings

RECIPE FOR VEGETABLE GNOCCHI AND THE PRODUCTION PROCESS THEREOF

TECHNICAL FIELD OF THE INVENTION

The present invention refers to a recipe for industrially producing vegetable gnocchi and, in particular, cauliflower gnocchi and a production process thereof. Moreover, the invention relates to gnocchi obtained by said process in order to provide a food product that is nutritionally advantageous and easy to produce at an industrial level without any disadvantages.

STATE OF THE PRIOR ART

Recipes and related methods for making gnocchi have been known for a long time now and include many variations designed to mainly satisfy the tastes and desires of consumers.

In general, gnocchi are commonly produced from a basic recipe that includes potatoes, flour, egg, salt and sometimes also milk as ingredients. As mentioned, there are also numerous variations wherein the basic ingredients are changed according to specific needs or preferences. For example, eggs and milk may be eliminated due to problems of intolerance or allergies. Similarly, wheat flour, containing gluten, may be eliminated.

When modifying the most common recipe, wherein potatoes are the main ingredient, one encounters problems mainly related to the workability of the dough and to how the final cooked product holds together, i.e. the gnocchi. In effect, especially on the industrial level, the production of gnocchi may cause considerable difficulties if the ingredients that are commonly used are replaced by other ingredients.

It is known, for example, that the use of wheat flour and egg makes the dough workable because it is cohesive, even after cooking. Removing such ingredients makes it difficult for the dough to stick together to the point that traditional-sized gnocchi cannot be formed.

The substitution of these so-called binding ingredients is not easy, both because alternative ingredients to the traditional ones with binding capacity risk altering the taste decisively and in an unacceptable way, and because their tolerance is sometimes controversial and debated, since they in turn may, for example, trigger allergies.

SUMMARY OF THE INVENTION

The technical problem behind this invention is therefore to devise a recipe for producing gnocchi the basic ingredients of which are substantially free of the most common allergenic substances, usually used to produce traditional potato gnocchi, and at the same time is free of the disadvantages associated with the difficulty of production in the absence of traditional allergenic binders.

This problem is solved by a recipe for gnocchi comprising a large percentage of products with high fiber content in association with binders free of substances of animal origin and gluten.

A first object of this invention is therefore a recipe for producing vegetable gnocchi.

A second object is a process for producing said gnocchi.

A third object are gnocchi produced according to said process.

Further features and advantages of the recipe, of the method and of the gnocchi according to the invention will become more evident from the following description of some embodiments provided purely by way of non-limiting example.

DETAILED DESCRIPTION OF THE INVENTION

The idea behind the present invention is to create a recipe that results in gnocchi with a traditional appearance and texture, similar to potato gnocchi, but free of allergenic substances. In effect, it is known that the world's population is exponentially developing more allergies and intolerances to foods that until a few years ago were consumed without problems by most people. Basically, even a simple product such as traditional gnocchi contains highly allergenic substances such as egg proteins and gluten from the flour.

Therefore, the main problem in developing such an idea was to find alternative ingredients without these disadvantages but, at the same time, are suitable to provide a basic, workable dough in order to obtain a final product very similar to traditional potato gnocchi.

In addition, it was decided to introduce ingredients in the recipe that provide healthy nutrients, while at the same time, in particular cases, considerably lower the starch content of the final product. In effect, the potato, being the main ingredient of traditional gnocchi and being rich in starch, from a dietary point of view, is not preferred.

At this point, the choice of ingredients fell on vegetable foods rich in fiber and preferably antioxidants.

The term fiber-rich plants in this description means vegetables and legumes with a fiber content of at least 1.6 grams, preferably at least 2 grams, per 100 grams of edible cooked product. Vegetable products of this kind specifically comprise chickpeas, beans, broad beans, lentils, peas, soybeans, asparagus, broccoli, cabbage, artichokes, fennel, eggplant, turnips, celeriac, spinach, Jerusalem artichokes. Preferably, among these vegetable products, those with a starch content of less than 2% by weight of the cooked edible product are selected.

Consequently, the base recipe comprises a purée of fiber-rich vegetable products and grain and non-grain gluten-free flour. Preferably, the recipe includes the addition of natural thickening products of vegetable origin, salt, and oil of vegetable origin (such as extra virgin olive oil).

In the present description, the term purée means a homogeneous mass consisting of the crushing, shredding, grinding and/or mashing of a fiber-rich plant product, as defined above, so as to obtain a collection of homogeneous particles. The purée may be raw or cooked.

However, the combination of the aforesaid ingredients in the recipe has caused difficulties in working with the dough and making it hold together in order to keep it from disintegrating, as well as in making a cohesive final product.

Therefore, only after numerous attempts has the recipe been achieved to produce gnocchi that comprises as basic ingredients, by percentage of the total weight of the dough, vegetable purée rich in fiber at 40% to 90% and grain and non-grain gluten-free flour at 10% to 60%, preferably natural thickeners at 1% to 6% and salt at 0.1% to 2%.

Preferably, vegetable purée is chosen from vegetable purées belonging to the Brassicaceae (Cruciferae) family, such as cauliflower, black cabbage, Chinese broccoli, romanesco, cabbage, Savoy cabbage, red cabbage, kale, Brussels sprouts, broccoli, turnip greens, vegetables belonging to the Apiaceae (Umbellifeae) family, such as turnip, celeriac and their mixtures, vegetables belonging to the Solanaceae family, such as peppers, excluding potatoes, and vegetables belonging to the Fabaceae family, such as peas. More preferably, the purée is made of cauliflower. Moreover, preferably the percentage of vegetable purée is between 70% and 90%.

The gluten-free flour is preferably a flour selected from cassava flour, amaranth flour, buckwheat flour, corn flour, millet flour, quinoa flour, rice flour, sorghum flour, teff flour, fava bean flour, bean flour, chickpea flour, pea flour, lentil flour, locust bean gum, soy flour, hemp flour and mixtures thereof. More preferably, the flour is cassava flour. Moreover, preferably gluten-free flour is present at between 10% and 30%.

Natural vegetable thickeners are preferably chosen from potato flour, agar-agar, gum arabic, carrageenan, some of the flours listed above including locust bean gum, guar gum, pectin, cellulose derivatives and mixtures thereof. More preferably, the thickener is potato flour. In addition, the percentage of thickener is always preferably between 2.5% and 4.5%.

It should be noted that the combination of fiber-rich vegetable products with gluten-free flour at the percentages specified in the present invention has proved surprisingly advantageous in obtaining an easily workable and cohesive dough, as well as an equally cohesive cooked end product, i.e. one that does not break down. Without tying itself to any theory, probably the structure of the dough and of the highly fibrous final product allows a great quantity of water to be harnessed so as to facilitate the cohesion and the homogeneity of the dough and the final gnocchi.

The salt is a common table salt, preferably fine or coarse white salt, pink salt, black salt, gray salt, blue salt, red salt, more preferably iodized sea salt. Moreover, the percentage of salt is preferably 1%.

According to a second object of the invention, the process to produce vegetable gnocchi from the aforesaid recipe comprises the stages of:
 a) making a vegetable purée;
 b) mixing this purée with grain and non-grain gluten-free flour;
 c) forming gnocchi from the dough obtained from said mixture;
 d) cooking the gnocchi in boiling water and/or steam;
 e) cooling the cooked gnocchi;
 f) freezing at −18° to −25° C. or refrigerating at 4° to 8° C.

According to one embodiment, step a) of making vegetable purée consists of shredding vegetable products, after they have been washed, if necessary. This step may be carried out with conventional equipment that is able to reduce the products to raw or cooked purée. Therefore, conventional presses, mashers, shredders and similar equipment may be used to make the purée homogeneous.

Preferably, step a) comprises the sub-steps of:
 i) cooking vegetable products in boiling water or steam, after washing if necessary, for a period of between 5 minutes and 20 minutes in boiling water in an immersion oven, or in a steam oven at a pressure of between 0.5 bar and 1.5 bar with times varying according to the pressure from 3 to 10 minutes;
 ii) shredding cooked vegetable products preferably with a cutter blade and cut section at 0.05 mm-4 mm pore diameter.

Step b) of mixing the ingredients of the recipe comprises the addition of the previously obtained vegetable purée in a kneading or mixing machine together with the grain and non-grain gluten-free flour, possibly natural vegetable thickener and salt at the percentages described above. The kneader/mixer is operated and maintained in operation until a homogeneous dough is obtained. Preferably, the purée, salt, natural thickener and gluten-free flour are added in sequence. The kneader/mixer preferably has rotating or planetary blades.

Step c) of formation comprises cutting the dough obtained during the mixing step into individual gnocchi of any shape and size. These variants are part of the common knowledge of one skilled in the art and therefore they are not described herein.

Step d) of cooking the gnocchi in boiling water and/or steam is carried out in conventional industrial containers for cooking food, with care taken to remove them from the same container at the end of cooking and to bring them quickly to the next stage of cooling. Preferably, the temperature of the boiling water is higher than 95° C. and the cooking time is from 3 to 7 minutes.

Step e) of cooling the gnocchi is carried out, for example, by contact with cold water, preferably by dropping into a tank of water at a temperature between 2° C. and 30° C. for 2-10 minutes.

Before step f) of freezing, the procedure may preferably comprise a stage of surface drying the gnocchi, carried out, for example, by passing the gnocchi deposited as a single layer on a conveyor belt where they are dried with jets of air ranging from 2° to 20° C. for a time between 2 and 10 minutes. Alternatively, the gnocchi are placed on a separate shelf and brought directly to the freezing or refrigeration stage.

According to a preferred embodiment of the invention, once cooled and dried, the gnocchi are subjected to a stage called oiling wherein they are transported on a conveyor belt under a roller with brushes impregnated with extra virgin olive oil or other vegetable oils such as sunflower oil, corn oil, oil of various seeds. In this way, they are covered with a layer of oil.

Advantageously, at the end of the oiling stage, the gnocchi have a water content between 60% and 90% by weight of the total weight of the gnocchi.

At this point, the gnocchi may be stored in the refrigerator at a temperature between 4° and 8° C. or in the freezer. Preferably, freezing may take place with all the systems available for this purpose, either on trolleys placed in blast chillers and cooled with cold air at −20 to −30° C., or in deep-freezing tunnels (continuous machines), or cryo-frozen, that is instantaneously frozen with liquid nitrogen that works at temperatures of −170° C. to −190° C., deep-freezing the product immediately and individually. After deep-freezing, the gnocchi may be packaged according to widely known methods not described here, such as, for example, plastic bags or trays, possibly in a protected atmosphere.

The following are some examples of embodiment of the invention for demonstrative and non-limiting purposes only.

Example 1—White Cauliflower Gnocchi

After removing the leaves of the fresh white cauliflower and washing it, the individual heads of the cauliflower are broken into coarse pieces and sent to a steam oven at a pressure of 1.1 bar for about 10 minutes. They are then transported to a shredding machine equipped with a cutter blade and a cutting section with a pore diameter of 2 mm. The purée thus obtained is poured into a kneading machine with rotating blades in a quantity of 70%, and then 1% salt, 2% potato flour, 27% cassava flour are added, the quantities of ingredients referring to the total dough. The result is a homogeneous dough that is sent to a gnocchi forming machine where it passes through an extruder at the exit of which it is cut into individual gnocchi. The individual gnocchi are then transported to a cooking tank in boiling water where they stay for 5 minutes. At the end of cooking, the gnocchi are cooled in a cold water tank at 10° C. for 5 minutes. The gnocchi then pass through a stream of air jets at a temperature of 20° C. for 1 minute to dry their surface. At this point, the gnocchi pass under a roller the brushes thereof being impregnated with extra virgin olive oil. The last stage consists of deep-freezing in blast chillers at −20° C.

Example 2—Yellow Pepper Gnocchi

A dough is prepared under the same conditions as described above with reference to Example 1, the ingredients of which are: yellow pepper purée 70%, cassava flour 27%, potato flour 2%, salt 1%. This dough is processed in the same way as described in Example 1.

Example 3—Red Turnip Gnocchi

A dough is prepared under the same conditions as described above with reference to Example 1, the ingredients of which are: red turnip purée 75%, cassava flour 21%, potato flour 3%, salt 1%. This dough is processed in the same way as described in Example 1.

Example 4—Pea Gnocchi

A dough is prepared under the same conditions described above with reference to Example 1, with the difference that the peas do not need to be first reduced to coarse pieces, the ingredients of which are: pea purée 79.5%, cassava flour 17%, potato flour 2.5, salt 1%. This dough is processed in the same way as described in Example 1.

Example 4—Savoy Cabbage Gnocchi

A dough is prepared under the same conditions as described above with reference to Example 1, the ingredients of which are: savoy cabbage purée 75.5%, cassava flour 20.5%, potato flour 3%, salt 1%. This dough is processed in the same way as described in Example 1.

Example 5—Broccoli Gnocchi

A dough is prepared under the same conditions as described above with reference to Example 1, the ingredients of which are: broccoli purée 76%, cassava flour 20%, potato flour 3%, salt 1%. This dough is processed in the same way as described in Example 1.

Example 6—Carrot Gnocchi

A dough is prepared under the same conditions as described above with reference to Example 1, the ingredients of which are: carrot purée 76%, cassava flour 20.1%, potato flour 2.9%, salt 1%. This dough is processed in the same way as described in Example 1.

Example 7—Porcini Mushroom Gnocchi

A dough is prepared under the same conditions as described above with reference to Example 1, the ingredients of which are: porcini mushroom purée 69%, cassava flour 27.3%, potato flour 2.7%, salt 1%. This dough is processed in the same way as described in Example 1.

The gnocchi obtained with the recipe and the process of the invention thus have excellent organoleptic and nutritional properties. In particular, it has been seen that the gnocchi, before freezing, comprise, by weight per 100 grams of gnocchi, a water content between 70% and 80%, fiber-rich vegetables between 60% and 90%. Advantageously, in particular, the gnocchi made from Brassicaceae and Umbelliferae vegetables have a starch content of less than 2 grams per hundred grams of edible product, antioxidants such as flavones and sulforaphane, and are free of gluten, egg and milk proteins.

The invention claimed is:

1. A composition for producing vegetable gnocchi the vegetable gnocchi being produced having a water content of between 70% and 80% by weight of the total weight of the vegetable gnocchi, the composition comprising, as a percentage of the total weight of the ingredients of the composition;
   40% to 90% of a fiber-rich vegetable pure, wherein potatoes are excluded from vegetables that are reduced to make the fiber-rich vegetable purée; and
   10% to 60% of grain and non grain gluten-free flour; wherein
   the composition is free of gluten, egg proteins and milk proteins.

2. The composition according to claim 1, further comprising natural vegetable thickening additives at 1% to 6% and/or salt at 0.1% to 2%.

3. The composition according to claim 2, wherein the natural vegetable thickening additives are selected from the group consisting of potato flour, agar-agar, gum arabic, carrageenan, locust bean gum, guar flour, pectin, cellulose derivatives and mixtures thereof.

4. The composition according to claim 1, wherein the vegetables of the fiber-rich vegetable purée are one or more vegetables of a family selected from the group consisting of
   Brassicaceae family;
   Apiaceae family;
   Solananceae family, excluding potatoes; and
   Fabaceae family.

5. The composition according to claim 1, wherein the gluten-free flour is selected from the group consisting of cassava flour, amaranth flour, buckwheat flour, corn flour, millet flour, quinoa flour, rice flour, sorghum flour, teff flour, fava bean flour, bean flour, chickpea flour, pea flour, lentil flour, locust bean gum, soy flour, hemp flour and mixtures thereof.

6. The composition according to claim 1, wherein the vegetables that are reduced to make the fiber-rich vegetable purée have a fiber content of at least 1.6 grams, per 100 grams, and a starch content of less than 2% by weight thereof.

7. The composition according to claim 6, wherein the vegetables that are reduced to make the fiber-rich vegetable purée are selected from the group consisting of chickpeas, beans, broad beans, lentils, peas, soybeans, asparagus, broccoli, cabbage, artichokes, fennel, eggplant, turnips, celeriac, spinach, and Jerusalem artichokes.

8. A process for producing vegetable gnocchi comprising the steps of:
   a) making a vegetable purée from vegetables, wherein potatoes are excluded from the vegetables that are reduced to make the vegetable purée;
   b) forming a dough by mixing said purée with grain and non-grain gluten-free flour at 10% to 60% as percentage of the total weight of the ingredients with optional natural vegetable thickening additives and salt comprising the natural vegetable thickening additives at 1% to 6% and/or the salt at 0.1% to 2%;

c) forming gnocchi from the dough obtained from said mixture;

d) cooking the gnocchi in boiling water and/or steam;

e) cooling the cooked gnocchi to obtain a vegetable gnocchi having a water content between 70% and 80% by weight of the total weight of the vegetable gnocchi; and f) at least one of the following:
preserving the vegetable gnocchi having water content between 70% and 80% in a refrigerator at 4° to 8° C.,
deep-freezing the vegetable gnocchi having water content between 70% and 80% at −18° to −25° C. or
cryo-freezing the vegetable gnocchi having water content between 70% and 80% at −170° C. to −190° C.;
wherein
the vegetable gnocchi having water content between 70% and 80% is free of gluten, egg proteins and milk proteins.

9. The process according to claim 8, wherein step a) comprises the sub-steps of:
i) shredding raw vegetables so as to obtain a raw purée, alternately ii) cooking the vegetables for 3-20 minutes in boiling water and/or steam and subsequently shredding the cooked vegetables in order to obtain said purée.

10. The process according to claim 8, wherein the step of forming the dough comprises sequentially kneading or mixing the purée, the salt, the natural thickening additives and the gluten-free flour.

11. The process according to claim 8, wherein the vegetable gnocchi having a water content between 70% and 80% is subjected to the deep-freezing or the preserving in the refrigerator, and before the step of deep-freezing or preserving in a refrigerator, the process further comprises a step of drying the surface of the vegetable gnocchi having water content between 70% and 80% with air flows and/or a subsequent oiling step wherein vegetable gnocchi having water content between 70% and 80% are carried on a conveyor belt underneath a roller having brushes soaked with extra virgin olive oil so that the vegetable gnocchi having water content between 70% and 80% are covered with an oil film.

12. A vegetable gnocchi comprising, by weight per 100 grams of gnocchi, a water content of between 70% and 80%, fiber-rich vegetables between 60% and 90%; wherein
potatoes are excluded from the fiber-rich vegetables, and
the vegetable gnocchi is free of gluten, egg proteins and milk proteins.

\* \* \* \* \*